(12) United States Patent
Lieven

(10) Patent No.: US 9,085,283 B2
(45) Date of Patent: Jul. 21, 2015

(54) WIPER BLADE WITH ELECTROMAGNETIC COMMAND

(75) Inventor: Patrick Lieven, Fronton (FR)

(73) Assignee: Airbus Operations S.A.S. (FR)

( * ) Notice: Subject to any disclaimer, the term of this patent is extended or adjusted under 35 U.S.C. 154(b) by 897 days.

(21) Appl. No.: 12/624,644

(22) Filed: Nov. 24, 2009

(65) Prior Publication Data

US 2010/0125967 A1    May 27, 2010

(30) Foreign Application Priority Data

Nov. 27, 2008   (FR) ..................................... 08 58059

(51) Int. Cl.
*B60S 1/04*      (2006.01)
*B60S 1/08*      (2006.01)
*B60S 1/34*      (2006.01)
*B60S 1/38*      (2006.01)

(52) U.S. Cl.
CPC ................. *B60S 1/38* (2013.01); *B60S 1/0455* (2013.01); *B60S 1/08* (2013.01); *B60S 1/3411* (2013.01); *B60S 2001/3812* (2013.01)

(58) Field of Classification Search
CPC ........ B60S 1/3411; B60S 1/0477; B60S 1/08; B60S 1/0491; B60S 1/4055; B60S 1/38; B60S 2001/3812; B60R 1/0602
USPC ...................... 15/250.202, 250.203, 250.361, 15/250.001, 250.43, 250.44
See application file for complete search history.

(56) References Cited

U.S. PATENT DOCUMENTS

| | | | | |
|---|---|---|---|---|
| 2,727,270 A | * | 12/1955 | Golub .......................... | 15/250.43 |
| 3,006,018 A | * | 10/1961 | Golab et al. ............... | 15/250.43 |
| 3,083,395 A | * | 4/1963 | Krohm ..................... | 15/250.454 |
| 3,089,175 A | | 5/1963 | Hinder | |
| 3,176,337 A | * | 4/1965 | Glynn ...................... | 15/250.453 |
| 3,372,423 A | * | 3/1968 | Anderson .................. | 15/250.43 |
| 3,392,415 A | * | 7/1968 | Shipman .................... | 15/250.38 |
| 3,623,183 A | * | 11/1971 | Wilfert et al. ............. | 15/250.351 |
| 3,967,340 A | * | 7/1976 | Cmolik ...................... | 15/257.01 |
| 4,719,661 A | * | 1/1988 | Hanselmann ............ | 15/250.203 |
| 5,426,813 A | * | 6/1995 | Miki et al. ............... | 15/250.003 |

(Continued)

FOREIGN PATENT DOCUMENTS

| | | |
|---|---|---|
| DE | 8712793 U1 | 10/1988 |
| DE | 40 28 713 A1 | 3/1991 |

(Continued)

OTHER PUBLICATIONS

Machine Translation of DE9200374, "http://translationportal.epo.org/emtp/translate/?ACTION=description-retrieval&COUNTRY=DE&ENGINE=google&FORMAT=docdb&KIND=U1&LOCALE=en_EP&NUMBER=9200374&OPS=ops.epo.org/3.1&SRCLANG=de&TRGLANG=en", Nov. 17, 2014.*

(Continued)

*Primary Examiner* — Ryan Kwiecinski
(74) *Attorney, Agent, or Firm* — Lerner, David, Littenberg, Krumholz & Mentlik, LLP

(57) ABSTRACT

The wiper blade for a surface of the type with a dual curvature, the wiper blade including a flexible blade element and a means of applying a pressing force to at least one point of the blade element in a direction Z mostly normal to the surface, also including means of varying the pressing force over time, at least some of the points, between pre-chosen positive and negative limit values, and means of commanding the pressing force. These means for bringing about local pressure or lift are electromagnetic.

11 Claims, 3 Drawing Sheets

(56) References Cited

U.S. PATENT DOCUMENTS

| | | | |
|---|---|---|---|
| 5,504,406 A * | 4/1996 | Shultz et al. | 318/443 |
| 5,568,670 A * | 10/1996 | Samples et al. | 15/250.48 |
| 5,742,973 A * | 4/1998 | Kessler | 15/250.46 |
| 5,778,483 A * | 7/1998 | Dawson | 15/250.04 |
| 5,822,827 A * | 10/1998 | Dimatteo et al. | 15/250.203 |
| 5,867,858 A * | 2/1999 | Kelly | 15/250.19 |
| 6,129,093 A | 10/2000 | Kelly | |
| 6,301,742 B1 * | 10/2001 | Kota | 15/250.46 |
| 2002/0152573 A1 * | 10/2002 | Tsukui et al. | 15/250.3 |
| 2006/0029649 A1 * | 2/2006 | Tafesh et al. | 424/443 |
| 2006/0059649 A1 * | 3/2006 | Meredith et al. | 15/250.41 |
| 2006/0130877 A1 * | 6/2006 | Huntzicker | 134/18 |
| 2006/0213020 A1 * | 9/2006 | Kota et al. | 15/250.44 |
| 2008/0005863 A1 * | 1/2008 | Hasegawa | 15/250.351 |
| 2008/0030531 A1 * | 2/2008 | Gao et al. | 347/9 |
| 2008/0034531 A1 * | 2/2008 | Beaver | 15/250.361 |
| 2009/0100627 A1 * | 4/2009 | Renke | 15/250.21 |

FOREIGN PATENT DOCUMENTS

| | | |
|---|---|---|
| DE | 9200374 U1 | 4/1992 |
| FR | 2909343 A | 6/2008 |

OTHER PUBLICATIONS

French Search Report and Written Opinion dated Jul. 2, 2009.

* cited by examiner

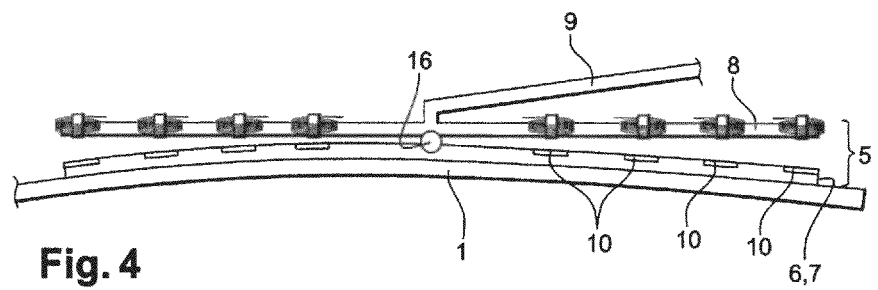
Fig. 4
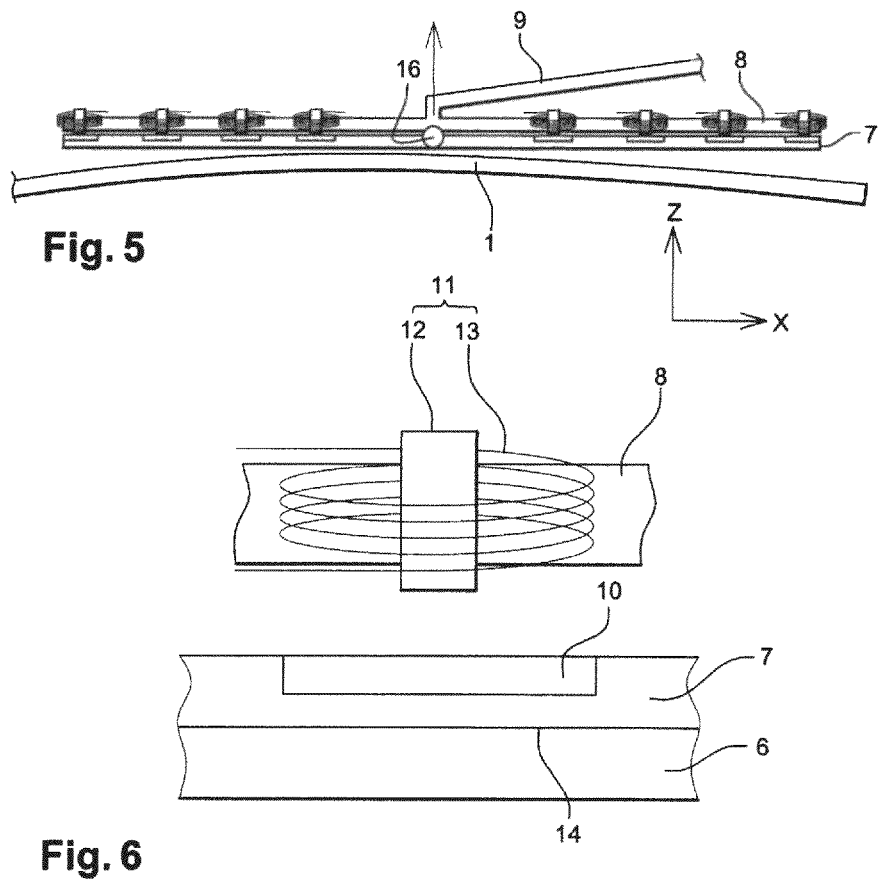
Fig. 5
Fig. 6

WIPER BLADE WITH ELECTROMAGNETIC COMMAND

BACKGROUND

1. Field

The disclosed embodiments lie within the field of windshield wipers and relates more specifically to windshield wipers for aircraft.

2. Brief Description of Related Developments

In the aeronautical field, in order to allow the pilot to see the external surroundings of the airplane, the cockpit is fitted with various windows and, in particular, with one or more front windows forming the windshield. These front windows, of which there are generally two in commercial airplanes, have hitherto conventionally been planar in shape, and their aerodynamic continuity with the fuselage at their periphery is provided by a seal.

In rainy weather, water flowing over the front window or windows, and insect impacts, may reduce visibility for pilots particularly during take offs, landings and taxiing. Hence, windshield wipers are fitted on the outside of these front windows. The way these work by cyclically sweeping an arc of a disk across the window using a wiper blade generally perpendicular to this arc and carrying a blade element is known, and similar for example to that of motor vehicles.

The windshield wiper blade therefore, during this cyclic sweep, covers a zone known as the wiping zone. For optimal wiping, contact between the blade element and the windshield needs to be sustained and uniform along the entire length of the blade, and needs to remain so throughout wiping.

In phases of non-use, for reasons of visibility, these windshield wipers are stored in a rest position generally situated on a (vertical or horizontal) edge of the wiping zone known as the storage position.

Elements of low rigidity, such as the seal, may be situated in the zone swept by the blade element of the windshield wiper during normal wiping (the wiping zone overlapping the seal in order to wipe a maximum zone of the window) or during its transition from the wiping zone to this storage position or vice versa, and may therefore be damaged as the blade element repeatedly passes over it. The consequence of this is both damage to the seal and therefore reduction in its effectiveness, and aerodynamic drag that also carries with it the possibility of damage to the transparencies.

For aerodynamic reasons, the design of airplane windshields is evolving toward a shape with a dual curvature, rather than the previous planar shape. This also makes it possible to increase the volume of the instrument panel behind the windshield while at the same time limiting the aerodynamic impact.

This dual curvature shape is characterized by a transverse curvature of the windshield, which starts out fairly pronounced near the lateral part of the fuselage and then becomes gentler near the central part of the fuselage, as viewed head-on, by a longitudinal curvature over the entire height of the windshield, blending into the overall shape of the fuselage.

Windshield wipers comprising rigid blade elements, suited to planar surfaces, are no longer suitable for these curved shapes because contact between the windshield and the blade element is no longer achieved over the entire surface of the wiper blade during the complete wipe.

An articulated windshield wiper of the conventional whiffletree type (FIGS. 1a and 1b) as used on motor vehicles, is better suited because its blade element tolerates a variation in curvature of the windshield during wiping.

However, there is a risk that contact between the blade element and the windshield will be interrupted momentarily, either fully or in part, at high aircraft speeds, because of the air flow.

In addition, this type of windshield wiper provides no solution to the problem of potential damage to the seal or seals and to the front glass during wiping or transitions to or from the windshield wiper storage position.

What is more, if the transition involves a lifting of the arm (FIG. 1c) before it is stored, the operation of the whiffletree leads, during lifting, to the two ends of the blade element remaining in contact with the windshield, and this is likely to cause local damage to this windshield or damage to the blade element itself.

SUMMARY

The aspects of the disclosed embodiments propose a windshield wiper device which maintains uniform contact between the blade element and the windshield it is to wipe throughout the movement associated with the wiping, and at the same time addresses the problem of damage to sensitive elements such as the windshield seals during any movements there may be from the wiping zone to the storage position or vice versa.

A second aspect of the disclosed embodiments minimizes wear on the windshield wiper blade element in its storage position.

A third aspect of the disclosed embodiments allows storage directly on the structure of the central windshield pillar, rather than near this central pillar, so as to give the pilot an even wider field of view.

A fourth aspect of the disclosed embodiments allows the entire blade element to be lifted simultaneously.

To these ends, the disclosed embodiments propose a wiper blade for a surface of the type with a dual curvature, said wiper blade comprising a flexible blade element and a means of applying a pressing force to at least two points of said blade element in a direction Z mostly normal to the surface; which also comprises means of varying the pressing force over time, and at least some of the points, between pre-chosen positive and negative limit values, and means of commanding said pressing force.

The possibility of varying the pressing force over time results in the ability to keep the blade element in contact with the surface even if there is a significant degree of concave or convex curvature.

This same wiper blade, attached to the end of a suspension arm, will be able to apply a greater contact force under difficult environmental conditions, for example in the event of air flow when an airplane is traveling at high speed.

The possibility of applying a negative pressing force results in a force of lifting the blade element, making it possible for example to avoid the unwanted pressing at the ends of blade elements attached to wiper blades of the conventional whiffletree type.

According to a preferred embodiment, the means for varying the pressing force over time are electromagnetic means.

These means are simple to implement and to control and can be small in size, suitable for incorporating into a windshield wiper blade of conventional size.

According to one advantageous embodiment, the wiper blade comprises a rigid rod and a flexible rod bearing the blade element and secured at least one point. Polarized magnets are incorporated into either the rigid rod or the flexible rod, on the side facing the other rod, and said other rod comprises, facing each of these magnets, a controllable electromagnet.

It will be appreciated that in order to afford the desired controllable electromagnetic force effect it matters not which way round the magnets are electromagnets are mounted.

More specifically, each of the electromagnets consists of a soft iron core surrounded by a coil of conducting wire.

These arrangements correspond to an easy industrial implementation of the device.

In an advantageous embodiment, the rigid rod, the flexible rod and the blade element are positioned in one and the same plane perpendicular to the main plane XY of the surface.

According to one particular embodiment of the wiper blade, the latter comprises eight polarized magnets positioned at uniform longitudinal intervals along the flexible rod.

The number of such magnets will naturally be dependent both on the length of the windshield wiper blade element and on the curvature of the window.

According to an advantageous embodiment, the wiper blade comprises means for pressing the flexible rod firmly against the rigid rod when the electromagnets are not operating.

These return means provide a rest position for the blade element suspended from the rigid rod.

Advantageously, the wiper blade comprises at least one passive electromagnet positioned between control electromagnets, for each of these passive electromagnets a polarized magnet on the rod facing this passive electromagnet, and means for measuring the current flowing through each coil of these passive electromagnets at each moment.

It will be appreciated that this presence of passive electromagnets makes it possible to measure a current flowing through the associated coils, the current being generated by each movement of the flexible rod with respect to the rigid rod. As a result, by integrating these measurements, it is possible to calculate the distance between these rods at each moment.

Once again, just as with the control electromagnets, it matters not whether the polarized magnets and the electromagnets are mounted on the rigid rod or on the flexible rod.

A second aspect of the disclosed embodiments targets a windshield wiper comprising a driving and suspension arm, and which comprises a wiper blade as explained, secured to one end of said suspension arm.

Advantageously, the windshield wiper comprising a driving and suspension arm comprises a wiper blade fitted with electromagnetic means positioned on flexible and rigid rods, said wiper blade being secured to one end of said suspension arm, further comprises control electronics for controlling the electromagnets, including a processor and a memory in which control logic is stored, these electronics also controlling a windshield wiper motor.

These control electronics may be dedicated to the operation of the windshield wipers or, on the other hand, may be common to numerous airplane devices. In that case, special-purpose software installed in an existing computer may control the operation of the electromagnetic means.

According to one particular embodiment, the driving and suspension arm comprises a means of immobilization in a plane situated a pre-chosen distance D away from the mean plane of the surface.

By preventing the blade element suspension means from moving along an axis normal to the circuit, a blade element lifting force will cause the blade element to lift, thus allowing the arm to be moved over an obstacle or fragile region, without the blade element coming into contact with these regions.

The disclosed embodiments also covers a method of controlling a windshield wiper as set forth, wherein:

in a wiping phase, at each moment, at least one of the electromagnets is operated in such a way that the magnet and the electromagnet facing one another repel one another, in a transition phase, the electromagnets are operated in such a way as to attract the magnets situated on the flexible rod facing them, and the suspension and drive arm is then moved over the storage position.

According to one advantageous embodiment, the method of controlling a windshield wiper comprising a wiper blade fitted with passive electromagnets includes a step of measuring the current flowing through the passive electromagnets, a step of storing these measurements in memory, and a step of calculating the distance between the flexible rod and the rigid rod at least one point corresponding to a pairing formed of a passive electromagnet and of a polarized magnet facing it.

More specifically, the method comprises, at least one moment in the wiping phase, a step of commanding at least some of the electromagnets to press or to lift, based on a comparison between the angular position of the arm at this moment and a pre-stored wiping pattern, and comprising for each said angular position of the wiper blade in its wiping zone A on the window, which electromagnets need to lift the blade element.

This arrangement corresponds to the wiping of a zone of predetermined shape made up of disk segments each corresponding to a wiping by the blade element facing an electromagnet commanded to press.

Yet another aspect of the disclosed embodiments targets software designed for implementing the control method.

This arrangement targets the scenario in which windshield wiper control is performed by an existing computer running pre-stored software to control the windshield wipers.

BRIEF DESCRIPTION OF THE DRAWINGS

The aspects and advantages of the disclosed embodiments will be better understood from reading the description and from the drawings of one particular embodiment, given by way of nonlimiting example, and in respect of which the drawings depict:

FIG. 4 is a schematic side view of a windshield wiper according to the disclosed embodiments in contact with the windshield, FIG. 5 is a schematic side view of a windshield wiper according to the disclosed embodiments, not in contact with the windshield (lifted position), FIG. 6 is a schematic view of a detail of a windshield wiper blade according to the disclosed embodiments.

DETAILED DESCRIPTION OF THE DISCLOSED EMBODIMENTS

The disclosed embodiments take its place in the front part of an airplane fuselage, at cockpit windshield level.

For the remainder of the description there is defined an axis known as the horizontal axis Y, tangential to the windshield locally and situated in an airplane horizontal plane. Likewise, there is defined an axis known as the interior-exterior axis Z that coincides with the local normal at a point Pi to the windshield of the airplane. Finally, an axis known as the longitudinal axis X, tangential to the windshield locally and perpendicular to the other two axes completes this frame of reference. The terms top and bottom will be employed with reference to the interior-exterior axis Z.

Figure 1A:
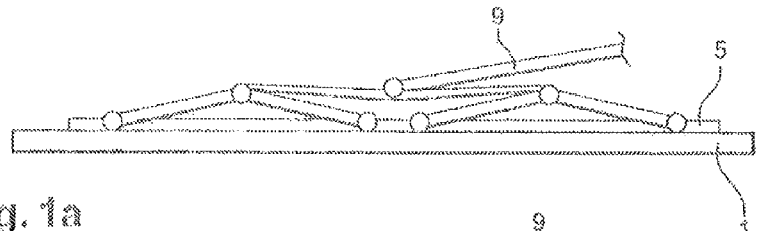
FIGS. 1a and 1b illustrate a windshield wiper blade of the whiffletree type, on a planar window and on a window exhibiting curvature.
Figure 1B:
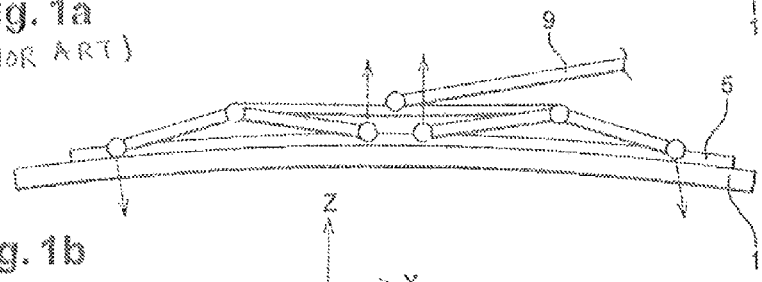
Figure 1C:
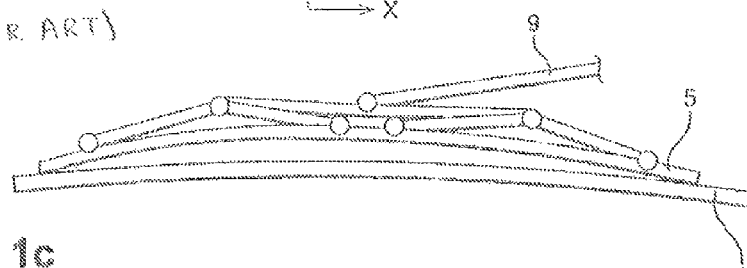
FIG. 1c depicts the same wiper blade during lifting.
Figure 2:
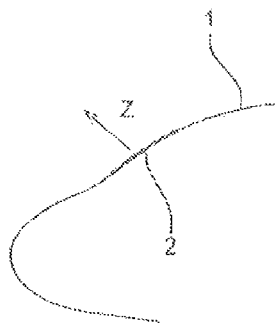
FIG. 2 is a side view of the front part of an airplane fuselage.
Figure 3:
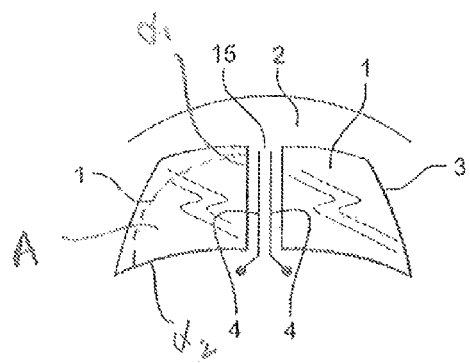
FIG. 3 is a head-on view of the front part of an airplane fuselage.

As may be seen from FIG. 3, the windshield in this entirely nonlimiting example has two front windows 1 connected to the fuselage 2 by a flange and a seal 3. In the example illustrated in FIG. 2, the two front windows 1 are separated by a vertical pillar 15.

A windshield wiper 4, illustrated in FIG. 3, is installed facing each of the front windows 1 and has the function of wiping the surface of said window 1 with a cyclic sweep, driven and controlled by a motor of the type known to those skilled in the art. The two windshield wipers 4 are positioned symmetrically for the two front windows that make up the windshield, and are stored, as may be seen in FIG. 3, in a rest position, in this instance a vertical position situated in close proximity to the vertical pillar 15.

A windshield wiper 4 according to the disclosed embodiments, depicted schematically in FIG. 4, comprises a wiper blade 5 secured to one end of a driving and suspension arm 9. The wiper blade 5 may be secured to the suspension arm 9 substantially in the middle of the blade 5, as illustrated in FIG. 4, or, by contrast, at one of its ends.

The suspension arm 9 is secured by its other end to a drive spindle intended to impart to the arm 9 and to the wiper blade 5 a reciprocating rotational movement parallel to the main plane of the wiping zone A of the window 1 that the said wiper blade 5 is to wipe.

The wiper blade 5 comprises a rigid rod 8 and a flexible rod' 7, the latter secured to a blade element 6. The rigid rod 8, the flexible rod 7 and the blade element 6 are positioned in one and the same plane perpendicular to the main plane XY of the wiping zone A.

The blade element 6 of the wiper blade 5 is similar to the blade element of known-type airplane or car windshield wipers. This blade element 6 is, for example, made of rubber or elastomer or any other material for this kind of application.

It will be appreciated that the blade element 6 is chosen to be flexible enough that it can conform to a line on the double-curvature surface if a pressing force is applied to it at a sufficient number of points to ensure contact over its entire length.

Figure 7:
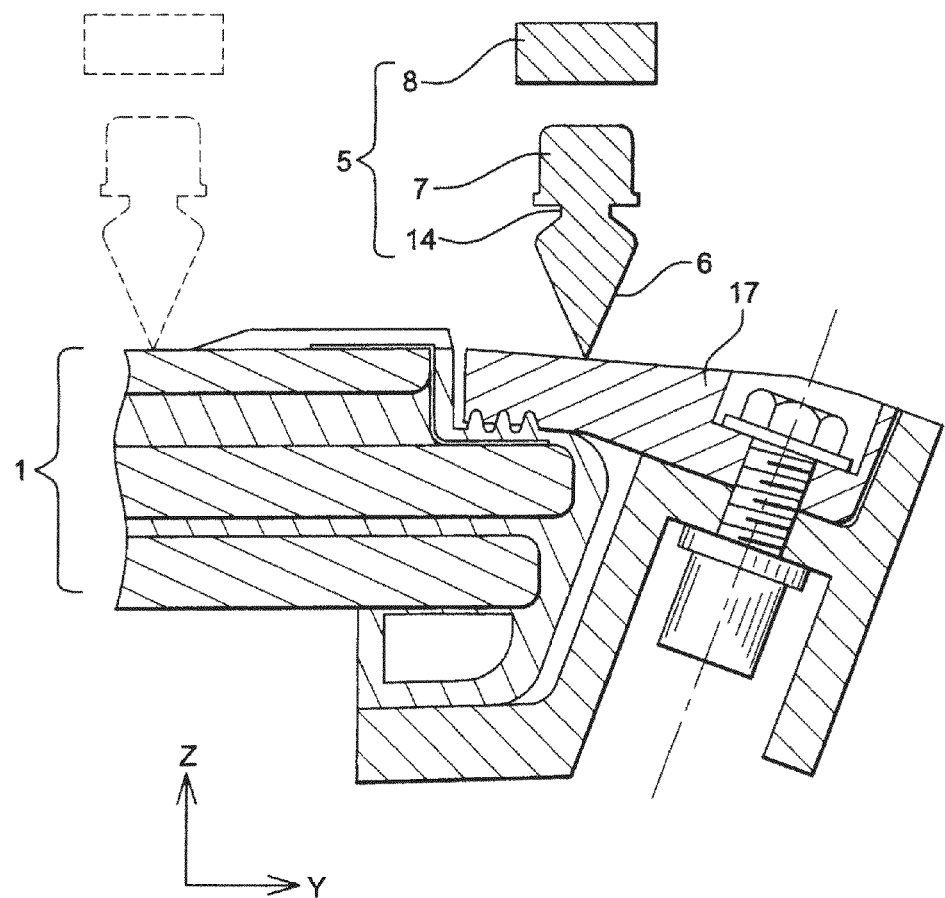
FIG. 7 is a detailed sectional view of the windshield wiper and of the structure of the airplane around a storage zone situated on the central pillar between the windshield windows.

It is of triangular cross section as may be seen in FIG. 7, one vertex of the triangle being directed toward the windshield 1 along the interior-exterior axis Z. The blade element 6 is secured along its entire length to the flexible rod 7 by a zone 14 that has lower resistance to transverse flexing, so as to allow it to be inclined slightly about its longitudinal axis in its movement of sweeping across the window 1.

The suspension arm 9 and the blade element 6, and the way in which they are attached to their respective support, are known per se to those skilled in the art and do not fall within the scope of the disclosed embodiments and are therefore not detailed further here.

The rigid rod 8 is mainly straight or slightly curved with its concave side facing toward the surface of the window, and a few tens of centimeters long. It is directed along an axis substantially parallel to the main plane XY of the wiping zone A. It is made of a rigid non-metallic material such as plastic.

The flexible rod 7 is of the same length as the fixed rod 8 which it faces. In this particular example it is of rectangular section, of rectilinear or slightly curved shape. It is made of an elastic material. It exhibits flexibility in the vertical plane such that its shape can conform to any singular or multiple curvature of the windshield 1 and, in one specific embodiment, has a shape that conforms to the shape of the rigid rod 8. By contrast, it is rigid in the horizontal XY plane (parallel to the main plane of the wiping zone A).

The flexible rod 7 of the wiper blade 5 and the rigid rod 8 are secured at their respective middles by a pin 16 that allows the flexible rod 7 to rotate freely with respect to the rigid rod 8 in their common vertical plane, but is able to transmit to the flexible rod and to the blade element the forces for moving the arm over the wiping zone A.

The flexible rod 7 and the rigid rod 8 are possibly attached at their ends by a return means that has not been illustrated in the figures, to prevent excessive lateral movement of the flexible rod 7 with respect to the rigid rod 8. This return means also guarantees that if no other force is applied to the flexible rod 7, the latter will come back to press firmly against the rigid rod 8.

Polarized magnets 10 are incorporated into the flexible rod 7 on the side facing the rigid rod 8. They are of the flat kind with a length measuring from one to a few centimeters. In this nonlimiting example, four polarized magnets 10, of known material and type, are positioned at uniform longitudinal intervals along each side of the pin 16 on the flexible rod 7.

The rigid rod 8 for its part comprises, facing each of these magnets 10, an electromagnet 11.

Each of these electromagnets 11 is made of a soft iron core 12 surrounded by a coil of conducting wire 13, both of known type. Each coil of conducting wire 13 is connected to control electronics, not depicted here, for example comprising a processor and a non-volatile memory in which control logic is stored, these electronics also controlling the windshield wiper motor.

The means of attaching the electromagnets 11 or the magnets 10 are known means which are not therefore detailed in this description.

The control electronics collectively or independently control the force applied by each electromagnet 11 to the polarized magnet 12 facing it, by individually controlling the current flowing through each coil 13.

It is clear that in the case of collective control, because of the polarization of the magnets 10, they will either be repelled by the electromagnets 11 facing them (FIG. 4), or attracted toward these electromagnets 11 (FIG. 5), depending on the direction of the current created in the coil of conducting wire 13 and chosen by the control electronics.

By contrast, in the case of individual control of the various electromagnets, half, for example, of the flexible rod 7 may be attracted toward the rigid rod 8, while the other half is repelled toward the window 1 of the windshield. The electronics therefore allow differential local control, according to a logic already stored in memory and which for example takes into consideration the shape of the zone to be wiped and an obstacles there might be in this zone.

In operation, during the phase of wiping the window 1, the windshield wiper 4 describes a sector of a disk on the exterior face of the window 1, this disk sector being determined by pre-chosen limit angles α1 and α2. The wiping zone A is a zone inside this disk sector and usually coincides with it.

Throughout this wiping phase, each of the coils of conducting wire 13 has a DC current passed through it in a direction such that the magnet 10 and the electromagnet 11 facing it repel one another.

Because the magnets 10 and the electromagnets 11 repel one another, the flexible rod 7 is pressed toward the windshield, and the blade element it supports is therefore pressed firmly against the window 1 throughout the wiping phase. Contact between the blade element 6 and the windshield 1 is uniform over the entire wiping zone if the number of magnet 10—electromagnetic 11 pairings chosen is compatible with the known curvature of the window 1.

If some of the electromagnets are controlled independently of one another, it is possible to lift part of the blade element while keeping the remainder of said blade element pressing, for example, by having previously stored in memory a wiping pattern that includes, for each angular position of the wiper blade in its wiping zone A on the window 1, information as to which electromagnets 11 are to command the lifting of the blade element 6.

In this way, it is possible to define a wiping zone A of a shape that is other than a sector of a disk. The blade element 6 can leave the glazed zone at least at one of its ends and be lifted at this point, while continuing to wipe at the other end. The wiping zone A can therefore cover a far greater proportion of the window 1 and its shape is limited simply by the number of control electromagnets 11 and by the flexibility of the blade element 6. The wiping zone A may adopt the shape of a collection of disk segments, each corresponding to the wiping by the blade element 6 opposite an electromagnet 11 commanded to press.

When it becomes needless to wipe the windshield, and in order to offer the pilot greater visibility, the windshield wipers 4 need to be transferred to a storage position. One advantageous storage position as depicted in FIG. 3 is the position on the vertical pillar 15 situated between the two front windows 1 of the windshield.

To attain this position at the end of the wiping phase and in order to avoid the elements such as fragile seals or Z-bars which may lie in the path between the wiping zone and the storage position, the electromagnets 11 are operated in such a way as to attract the magnets 10 situated on the flexible rod facing them. FIG. 5 shows the position of the flexible rod 7 with respect to the rigid rod 8 when the electromagnets 11 and the magnets 10 are attracted toward one another. In this case, there is no longer any contact between the blade element 6 and the surface which is underneath along the interior-exterior axis Z.

In this way, the blade element 6 of the windshield wiper blade 5 is lifted against the rigid rod 8 and the latter can be moved over the storage position without contact with the surface through a suitable movement of the suspension arm 9.

FIG. 7 depicts a fragile element consisting of the seal 3 which amongst other things affords lightning protection. It is situated in the path between the wiping zone and the storage zone. When the flexible rod 7 is attracted toward the rigid rod 8, the fragile element is not touched by the blade element 6 in its transition toward the storage position.

In the storage position, the current through the coils 13 of the electromagnets 11 is reversed again, therefore causing the blade element 6 to press against the flange 17 of the window 1, which forms part of the vertical pillar 15.

The scope of the disclosed embodiments are not restricted to the details of the embodiments considered hereinabove by way of example but on the contrary encompasses modifications within the competence of those skilled in the art.

In an alternative form, in the storage position, in order to eliminate any friction which amongst other things contributes to the wear of the blade element 6, a decision may be made to power the electromagnets 11 to make them attract the magnets 10. Since the flexible rod 7 is attracted toward the rigid rod 8, the blade element does not therefore make contact with the surface of the fuselage.

In another alternative form, the electromagnets 11 may be fixed to the flexible rod 7 and the magnets 10 to the rigid rod 8, without this changing the result or the control logic.

In another alternative form, passive electromagnets are added to the fixed rod 8 between the control electromagnets 11, and polarized additional magnets are added to the flexible rod 7 facing each of these passive electromagnets.

The current flowing through each coil of these passive electromagnets is measured at each moment, the presence of this current indicating movement between the flexible rod 7 and the rigid rod 8 at this passive electromagnet, making it possible therefore to calculate the distance between these rods at each moment. It is therefore possible to determine the extent to which the flexible rod 7 is actually lowered or lifted with respect to the rigid rod 8 (rather than the value commanded by the current fed into the control electromagnets 11).

In this alternative form, it is also possible to check that the blade element has come into pressing contact with the window 1, when the current is increased in the coils 13 of the control electromagnets 11 without giving rise to any vertical movement of the blade element because the latter is pressed against the window 1, and therefore without any current being detected in the passive electromagnets.

Hence, assuming that the suspension arm 9 is able to move only in a plane parallel to the window 1, once the blade element 6 comes into contact with the window 1, any additional current sent to the coils 13 simply results in an increase in the force with which the blade element is pressed against the window 1. It becomes possible to control this pressing force applied to the window 1 by the blade element 6 precisely at each point, for example according to the speed of the airplane. It is also possible for the pressing force on the blade element 6 to be increased cyclically when, during its reciprocating wiping movement, said blade element 6 is basically perpendicular to the longitudinal direction X of the air flow.

By way of a related issue, measuring the distance between the flexible rod 7 and the rigid rod 8 at these various points corresponding to the passive electromagnets and storing these measurements in memory makes it possible to detect abnormal wear on the blade element 6 at some point, and therefore issue a maintenance alert.

The presence of passive electromagnets also makes it possible to detect when the blade passes over a metal zone (such as the one present along the vertical pillar 15), which zone also modifies the current passing through the coils of the passive electromagnets. In such a case, the control electronics for example cause the blade element 6 to be partially lifted over that part of its length which is in the process of passing over said metal zone.

What is claimed is:

1. A wiper blade for a surface of a type with a dual curvature, said wiper blade comprising:
    a rigid rod having a fixed predetermined shape,
    a flexible rod bearing a flexible blade element and secured at at least one point to the rigid rod, the flexible rod being flexible relative to the rigid rod and configured to assume at least a first shape generally conforming to the shape of the rigid rod and a second shape generally conforming to a curvature of the surface,
    means for applying a different independently controlled, amount of pressing force to individual ones of at least two points of said flexible blade element in a direction Z mostly normal to the surface, means for varying the different pressing forces over time, between pre-chosen positive and negative limit values, and means for commanding the different pressing forces, wherein the means for varying the different amounts of independently controlled pressing forces over time are electromagnetic means comprising polarized magnets incorporated into either the rigid rod or the flexible rod, on the side facing the other rod, said other rod comprising, facing each of these magnets, a controllable electromagnet, at least one passive electromagnet positioned between control electromagnets and having a coil;

a polarized magnet disposed on the rod facing the passive electromagnet for each of the at least one passive electromagnet; and means for measuring the current flowing through each coil of the passive electromagnets at each moment.

2. The wiper blade as claimed in claim 1, wherein each of the electromagnets comprises a soft iron core surrounded by a coil of conducting wire.

3. The wiper blade as claimed in claim 1, wherein the rigid rod, the flexible rod and the blade element are positioned in one and the same plane perpendicular to the main plane XY of the surface.

4. The wiper blade as claimed in claim 1, further comprising eight polarized magnets positioned at uniform longitudinal intervals along the flexible rod.

5. The wiper blade as claimed in claim 1, further comprising means for pressing the flexible rod firmly against the rigid rod when the electromagnets are not operating.

6. A windshield wiper comprising a driving and suspension arm, and a wiper blade, secured to one end of said suspension arm, the wiper blade comprising:

a rigid rod having a fixed predetermined shape, a flexible rod bearing a flexible blade element and secured at at least one point to the rigid rod, the flexible rod being flexible relative to the rigid rod and configured to assume at least a first shape generally conforming to the shape of the rigid rod and a second shape generally conforming to a curvature of the surface, means for applying a different, independently controlled, amount of pressing force to individual ones of at least two points of said flexible blade element in a direction Z mostly normal to a surface, means of varying the different amounts of independently controlled pressing forces over time, between pre-chosen positive and negative limit values, and means for commanding the different pressing forces, wherein the means for varying the different amounts of independently controlled pressing forces over time are electromagnetic means comprising polarized magnets incorporated into either the rigid rod or the flexible rod, on the side facing the other rod, said other rod comprising, facing each of these magnets, a controllable electromagnet, at least one passive electromagnet positioned between control electromagnets and having a coil;

a polarized magnet disposed on the rod facing the passive electromagnet for each of the at least one passive electromagnet; and means for measuring the current flowing through each coil of the passive electromagnets at each moment.

7. The windshield wiper as claimed in claim 6, wherein the means for varying the different pressing forces over time further comprises control electronics for controlling the electromagnets, including a processor and a memory in which control logic is stored, the control electronics also controlling a windshield wiper motor.

8. The windshield wiper as claimed in claim 6, wherein the driving and suspension arm comprises a means of immobilization in a plane situated a pre-chosen distance D away from a plane of the surface.

9. A method of controlling a windshield wiper, the windshield wiper comprising:

a driving and suspension arm, and a wiper blade secured to one end of said suspension arm, the wiper blade comprising:

a rigid rod having a fixed predetermined shape, a flexible rod bearing a flexible blade element and secured at at least one point to the rigid rod, the flexible rod being flexible relative to the rigid rod and configured to assume at least a first shape generally conforming to the shape of the rigid rod and a second shape generally conforming to a curvature of the surface, means for applying a different, independently controlled, amount of pressing force to individual ones of at least two points of said flexible blade element in a direction Z mostly normal to a surface, the windshield wiper further comprising:

means for varying the different amounts of independently controlled pressing forces over time, between pre-chosen positive and negative limit values, and means for commanding the different pressing forces, wherein the means for varying the different amounts of independently controlled pressing forces over time comprise elements positioned facing one another on the rigid or flexible rods, wherein the means for varying the different amounts of independently controlled pressing forces over time are electromagnetic means comprising polarized magnets incorporated into either the rigid rod or the flexible rod, on the side facing the other rod, said other rod comprising, facing each of these magnets, a controllable electromagnet, said means for varying the different amounts of independently controlled pressing forces over time further comprising control electronics for controlling the controllable electromagnets, including a processor and a memory in which control logic is stored, these electronics also controlling a windshield wiper motor, wherein the method comprises:

in a wiping phase, operating at least one of the controllable electromagnets at each moment in such a way that the polarized magnet and the controllable electromagnet facing one another repel one another, thereby causing the flexible rod to assume the second position; and in a transition phase, operating the controllable electromagnets in such a way as to attract the polarized magnets situated on the flexible rod facing them, thereby causing the flexible rod to assume the first position, and moving the suspension and driving arm over a storage position.

10. The method as claimed in claim 9, wherein the windshield wiper further comprises passive electromagnets, the method further comprising:

measuring a current flowing through the passive electromagnets, storing these measurements in memory, and calculating a distance between the flexible rod and the rigid rod at at least one point corresponding to a pairing formed of a passive electromagnet and of a polarized magnet facing it.

11. The method as claimed in claim 9 further comprising during at least one moment in the wiping phase, commanding at least some of the controllable electromagnets to press or to lift, based on a comparison between an angular position of the arm at this moment and a pre-stored wiping pattern, and comprising for each said angular position of the wiper blade in its wiping zone A on the window, which controllable electromagnets need to lift the blade element.

* * * * *